United States Patent [19]

Buhayar et al.

[11] 3,756,452
[45] Sept. 4, 1973

[54] METHOD AND APPARATUS FOR SEPARATING AND FEEDING CONTAINERS

[75] Inventors: Eric S. Buhayar; James E. Hazard, both of Swarthmore, Pa.; John J. Jaagus, Broomall, Pa.; Fred W. Werner, Media; Robert W. Wheeler, Milmont Park, all of Pa.; Robert C. Crowe, Cherry Hill, N.J.

[73] Assignee: Scott Paper Company, Delaware, Pa.

[22] Filed: Mar. 4, 1970

[21] Appl. No.: 19,133

Related U.S. Application Data

[62] Division of Ser. No. 644,955, June 9, 1967, Pat. No. 3,438,275.

[52] U.S. Cl............. 221/1, 214/8.5 C, 221/171, 221/218, 221/225, 221/236, 221/290
[51] Int. Cl............................................. B65g 59/10
[58] Field of Search.................. 221/171, 1, 222, 221/224, 225, 236, 237, 253, 259, 277, 290, 297, 298, 210, 279, 217–221; 214/8.5 C, 8.5 G, 8.5 H, 8.5 C

[56] References Cited
UNITED STATES PATENTS 3,461,459  10/1965  Willseg et al. ............... 221/221
2,640,606  6/1953   Cox ............................. 221/222
2,534,169  12/1950  Hope ........................... 221/279
2,556,740  6/1951   Polsen et al. ............ 221/236 X
3,407,965  10/1968  Kuhlman ...................... 221/210
3,581,937  6/1971   Johnson ................... 221/259 X

FOREIGN PATENTS OR APPLICATIONS

489,418  7/1938  Great Britain ............... 221/290

*Primary Examiner*—Robert B. Reeves
*Assistant Examiner*—David A. Scherbel
*Attorney*—William J. Foley, Robert S. Bramson and John W. Kane, Jr.

[57] ABSTRACT

A method and apparatus is disclosed for individually separating and feeding containers from axially aligned or nested relationship in a stack to a moving turret assembly. The feeding apparatus may employ several successive container conveying sections, two of which operate to separate containers from a line or stack and feed them to a remote position, and one of which controls and varies the angular orientation of the axis of each object as the object approaches the turret assembly, whereby placement of the objects on mandrels of the turret assembly may be accomplished while the turret assembly moves continuously at high speeds.

12 Claims, 9 Drawing Figures

Fig. 1

INVENTORS.
ERIC S. BUHAYAR
ROBERT C. CROWE
JAMES E. HAZARD
JOHN J. JAAGUS
FRED W. WERNER
ROBERT W. WHEELER

BY
ATTORNEY.

INVENTORS.
ERIC S. BUHAYAR
ROBERT C. CROWE
JAMES E. HAZARD
JOHN J. JAAGUS
FRED W. WERNER
ROBERT W. WHEELER

BY
ATTORNEY.

METHOD AND APPARATUS FOR SEPARATING AND FEEDING CONTAINERS

This application is a Division of U.S. Pat. application, Ser. No. 644,955, filed June 9, 1967, entitled METHOD AND APPARATUS FOR PRINTING CONTAINER SIDE WALLS now U.S. Pat. No. 3,438,275.

BACKGROUND OF THE INVENTION

1. Field of the Invention

This invention relates to a method and apparatus for separating or denesting and feeding cylindrical objects from a line or a stack onto a mandrel moving through an orbital path generally perpendicular to, and intersecting at a remote point, the path of the objects being fed thereto. One particular application of this method and apparatus is the feeding of cylindrical objects into a printer of the continuous type as described in this application. However, this aspect of the invention broadly relates to object separating and feeding apparatus which, in general, is also useful in a wide variety of container handling applications.

The term "cylindrical object" as used throughout the specification and claims is intended to include right cylindrical objects such as cans as well as other hollow objects whose outer surface is substantially a surface of revolution generated by the rotation of a line about an axis, including objects, such as cups and the like, which may have one or more frusto-conical surfaces. When the term "frusto-conical" is used in the specifications and claims, a cylindrical object as defined above which has at least one frusto-conical surface, such as a cup, is intended. It will be apparent and should clearly be understood that the invention relates to the treatment of these and other articles of a nature similar to that described above where this extension is warranted and practicable.

2. Description of the Prior Art

In the past, the printing of the sidewalls of cylindrical objects such as containers has been extremely difficult and laborious. The high volume use and concomitant low cost of such objects dictate that any treatment process must be performed at a very high speed in order to be economical. The printing of paper cups is often done on the paper material in the flat sheet condition prior to its formation into the frusto-conical or cylindrical shape. However, such treatment is not possible or practical in the printing of plastic cups where the material undergoes considerable deformation during the formation of a cup. It is clearly impossible to do on glass containers. Thus, to perform the printing step prior to formation in either of the above types of objects would result in the complete or sustantial destruction of the image detail during formation.

The need for printing the side walls of containers has increased with the advent of thin walled plastic containers of solid sheet, foam, or laminates since these articles are generally formed at extremely high production rates by processes such as differential pressure forming, blowmolding, injection molding and the like. In addition to drinking cups, such articles are widely used in a large number of packaging and storage applications. In addition to decoration, it is desirable that the sidewalls of such containers and cups be printed to identify either the contents of the package, the manufacturer, or both.

Several economic aspects have a bearing on the printing problem. Such articles generally sell for a very low price which represents a nearly negligible fraction of the value of the package contents. Therefore, any printing process must be of sufficient low cost and high rapidity such that it adds very little to the cost of the article. In addition, any articles printed incorrectly must be discarded or, in some instances, ground to scrap and remolded. To achieve the above-mentioned low cost, manufacturers have to maintain a very low percentage of error and resulting scrap loss throughout the process of manufacture, including the printing stage. Thus, any printing process must be highly accurate and devoid of any treatment or handling which will damage the articles. This has been found difficult in the past at the high speeds required and with these types of articles.

In the past, printing systems have operated intermittently for separately positioning, stabilizing, and printing articles such as cups. Those familiar with mechanical devices can readily appreciate the speed limitations of intermittently operating apparatus. The inertia of the elements involved as well as the fragile nature of the article being treated makes it impracticable to consider treating more than about 150 to about 200 articles per minute. On the other hand, it generally has been thought to be too difficult to perform such an operation on articles of this nature in a continuous operation. Typical printing apparatus of the intermittently operating type is disclosed in U. S. Pat., No. 3,195,451 issued July 20, 1965 to J. C. Hovekamp et al.

Such printing apparatus as has been designed for continuous operation has been solely for the printing of the sidewalls of cylindrical cans, as distinguished from tapered sidewalls of frusto-conical objects such as cups. In this regard, see U. S. Pat., No. 3,261,281 issued July 19, 1966 to R. J. Hartmeister. In many respects, the complexity of this apparatus makes the problem of high speed printing of container sidewalls more foreboding. The rotating push rod assembly and dual can holding system of mandrels and retractable pockets dictate that the apparatus be made quite accurately and be adjusted carefully to insure reliability. While such apparatus might be used for printing metal cans, it is very doubtful that such apparatus could be used for printing more fragile objects such as containers or cups of paper, plastic, or glass.

In view of the above-mentioned difficulties and other deficiencies and shortcomings of the prior art, it was surprising to discover that reliable apparatus can be constructed which is capable of printing container sidewalls in a continuous manner, as distinguished from an intermittent manner, in an economical operation at much higher speed, on the order of 500 articles per minute and higher, with extremely low scrap losses due to article damage or printing inaccuracies in the high speed operation.

It is a principle object and advantage of the present invention to provide a method and apparatus for printing the sidewalls of cylindrical objects including frusto-conical cups or containers in a manner which not only overcomes many of the difficulties of the prior art, but which results in a number of significant advantages and improvements. In accordance with the invention, clear and accurate printing may be done on the sidewall of a cylindrical object by a continuous process which is extremely rapid and is quite economical. The printed image may consist of up to three or even more separate colors without encountering problems. The apparatus of the invention may be utilized to print in continuous operation the sidewalls of frusto-conical objects such as cups having tapered sides.

In order to successfully overcome the above-mentioned problems and to develope the printing apparatus and to carry out the printing method of the invention, it was found necessary to develope a number of ancillary methods and apparatus which form a part of the over-all printing method and apparatus but which are believed to have considerable application and utility separate and apart from the over-all printing method and apparatus. These developments arose from one or more of a variety of requirements such as the high speed continuous operation, the fragile nature of the article to be printed, and the shape of the surface to be printed.

In the manufacture of hollow cylindrical objects and especially frusto-conical objects such as cups and the like, such objects are generally transported between manufacturing stages in a stacked or nested condition so that they can be conveniently moved about in a minimum amount of space. These objects, especially when they are made of plastic or other materials are often quite brittle even though they possess some flexibility.

The rapid handling of these objects has presented numerous problems, one of which is the ability to rapidly separate successive objects from a stack or line of objects and to convey them into position at a treatment stage or on a treatment apparatus.

In the past, different types of cup feeders have been employed for denesting and feeding cups in intermittent operations. Many of these involved gravity or air pressure actuation of cups, the release and separation of cups from the stack being controlled by some gating device. While such feeding mechanisms are sometimes satisfactory for dispensers and intermittently operating equipment, they are completely unsuitable for a high speed continuous process. None of the known systems suggest any means for positively feeding denested cups onto mandrels moving through an orbital path perpendicular to the path of the cups.

Unexpectedly, it was discovered that cylindrical objects such as cups can be separated or denested and fed onto mandrels moving through such an orbital path relative to the path of the objects. It was even more surprising to find that such a feeder can be used to separate or denest and feed in a positive manner even relatively fragile objects at extremely high speed to treatment apparatus such as the printing apparatus of the invention. One aspect of the present invention is the ability to separate individual hollow cylindrical objects successively from one end of a stack of objects and to feed them onto a mandrel moving across the path of the objects at a remote point. This permits the mandrel to then convey the objects through a treatment stage in a supported condition.

The apparatus of the invention includes stack advancing means for advancing at least a portion of a stack of nested or aligned objects by engaging the periphery of at least one of the objects. Denesting means are arranged in the apparatus of the invention to engage the forwardmost object in the stack and to advance it more rapidly than the rate of advance of the stack. The apparatus also incorporates feeding means which are arranged to receive successive separated objects from the denesting means and to convey them toward a remote point. In a specific embodiment of the invention, the feeding means are arranged to convey successive separated objects in a predetermined orientation, and to feed the objects onto successive mandrels as they cross the path of successive objects.

It is an object of the present invention to provide a method and apparatus for individually separating or denesting and feeding hollow cylindrical objects, such as containers or cups, from nested or aligned relationship in a stack.

It is an additional object of the invention to provide such a method and apparatus arranged for placing hollow cylindrical objects onto a mandrel moving through an orbital path generally perpendicular to the path of the objects.

It is a further object and advantage of the invention to provide such a method and apparatus for handling such objects on a continuous basis rather than an intermittent basis.

These and other objects and advantages of the invention will become apparent from the detailed description of specific embodiments thereof which follow.

BRIEF SUMMARY OF THE INVENTION

The high speed continuous printing, treating, and handling apparatus of the invention includes a turret assembly which has a rotatably mounted frame, a plurality of support mandrels mounted for rotation and carried by the frame through an orbital path. Successive mandrels are substantially equidistantly spaced from one another. Feeding means are included for serially advancing cylindrical objects in a line and include object separating means for increasing the relative distance between the leading object and successive objects in the line. The feeding means are adapted to advance successive cylindrical objects toward the turret assembly and to place them onto successive support mandrels carried by the rotatably mounted frame through the object pickup section of the orbital path.

A more specific embodiment of the invention which is adapted to treat hollow objects having a frusto-conical configuration, includes mandrels having tapered sides and a frusto-conical shape.

The invention also includes a method for feeding and separating cylindrical objects having one open end, one closed end, an upstanding sidewall, and a peripheral flange extending outwardly therefrom. This method is applicable to cylindrical objects including those having either a right cylindrical or a frusto-conical configuration. In the method, cylindrical objects are individually separated and fed from a source. The objects are successively placed onto moving mandrels which cross their path at a remote point.

The invention includes apparatus for individually separating and feeding hollow cylindrical objects having an upstanding sidewall and a peripheral flange extending outwardly therefrom from aligned or nested relationship in a stack. The separating and feeding apparatus includes stack advancing means adapted to engage the flange of at least one of a plurality of objects forming the stack to advance at least a portion of the stack in a direction substantially parallel with the axis of the object. Denesting means are provided to engage the flange of the forwardmost object in the stack and to advance the object axially at a rate greater than the rate of advance of the stack. Feeding means are provided to receive successive objects from the denesting means and to convey them toward a remote position in a predetermined orientation.

The invention also includes a method of individually separating and feeding hollow cylindrical objects having upstand-ing sidewalls and a peripheral flange extending outwardly therefrom from aligned or nested relationship in a stack. The method includes the step of engaging at least one of a plurality of cylindrical objects forming a stack and advancing the preceding portion of the stack in a direction parallel with the axis of the object. The forwardmost object in the stack is gripped by engaging spaced portions of its peripheral flange. It is then advanced at a rate greater than the rate of advance of the remainder of the stack. The object is again gripped by engaging spaced portions of the peripheral flange and advanced toward a remote position. In some embodiments of the method of the invention, the angular orientation of the axis of the object is controlled as the object is advanced toward the remote position. In some embodiments of the invention, the objects within the preceding portion of the stack are rotated about their axes prior to gripping of the forwardmost object in the stack. Also, some embodiments of the method include placing the cylindrical object onto a moving mandrel as it crosses the path of the object.

The invention has been generally described and some of its features pointed out in the foregoing. Specific embodiments will now be described with referece to the accompanying drawings in which like reference characters have been used to refer to like parts wherever they may occur.

BRIEF DESCRIPTION OF THE DRAWINGS

FIGS. 14A through 14D are progressive views illustrating sequential stages of placement of an object onto a moving mandrel by the object feeding apparatus of the invention.

DESCRIPTION OF THE PREFERRED EMBODIMENTS

Figure 1:
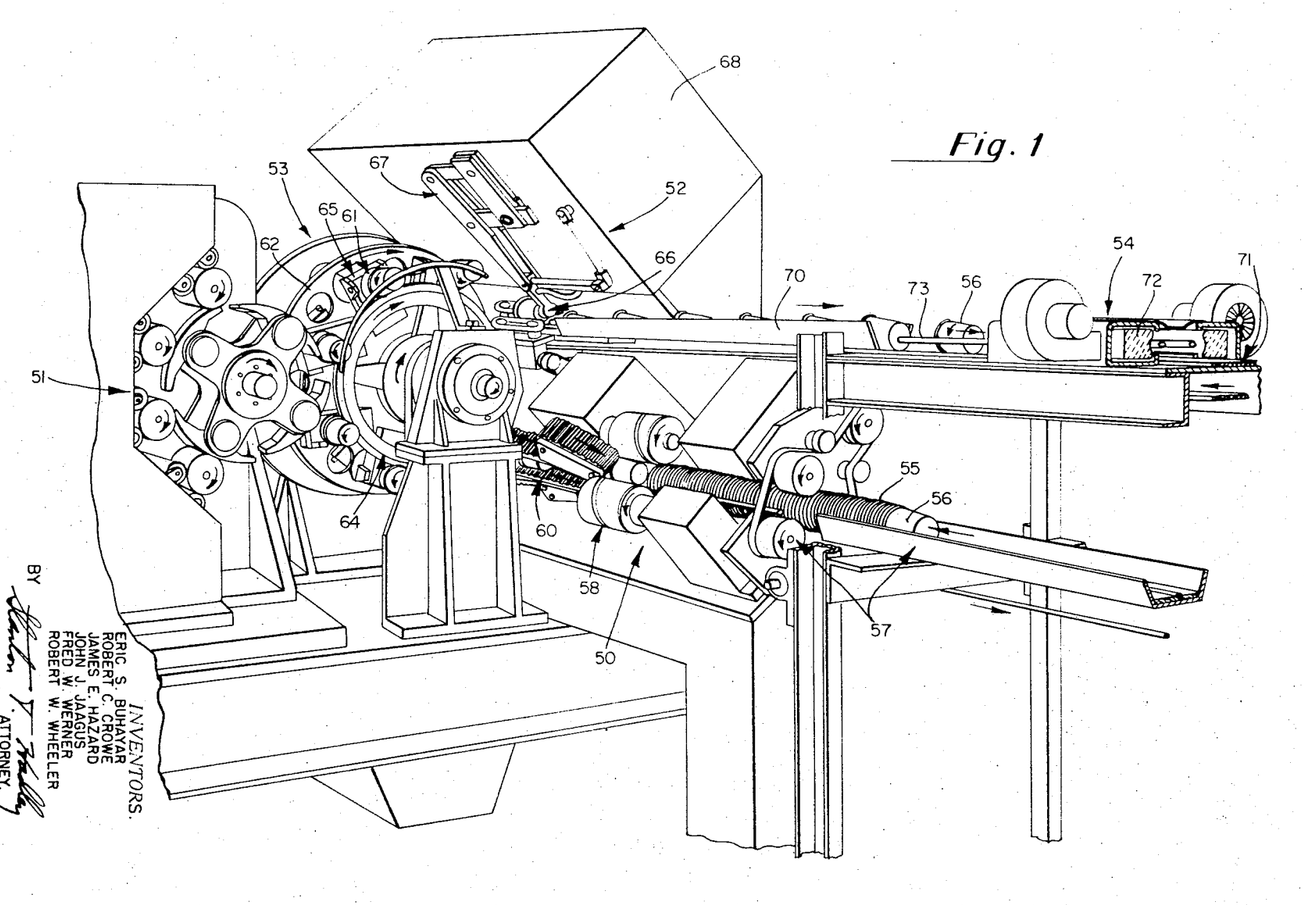
FIG. 1 is a perspective view of a specific embodiment of high speed continuous printing, treating, and handling apparatus of the invention.

FIG. 1 illustrates a preferred embodiment of high speed continuous printing, treating and handling apparatus of the invention. The apparatus illustrated in FIG. 1 is adapted for the decoration of the exterior surfaces of frusto-conical objects having tapered sidewalls and one open end such as plastic cups and the like. Such cups generally have a radially outwardly depending flange or bead which forms the lip of the cup. With slight modification of certain minor aspects in a manner which would be generally understood by one skilled in the art and as pointed out to some degree throughout this description, the apparatus can also be used to decorate the exterior surfaces of other types of cylindrical objects, including right cylindrical objects such as metal or plastic cans and the like. These objects generally have a peripheral raised strip or bead at one or both ends, allowing them to be handled in a similar manner.

The apparatus includes as elements thereof the following subassemblies, indicated generally by the respective reference numeral: object feeding apparatus 50, object printing apparatus 51, object removal apparatus 52, a turret assembly 53 for receiving objects from the object feeding apparatus 50 and for moving them past the object printing apparatus 51 to a position where they are transferred to the object removal apparatus 52, and object drying apparatus 54 arranged for receiving objects from the object removal apparatus 52 and for drying or curing decorating material applied to the surfaces of said objects by the object printing apparatus 51. In its broader aspects, the invention includes embodiments of the apparatus described above in which object printing apparatus 51 is replaced with other apparatus for treating the surfaces of objects while they are moved through the treatment in a supported condition by the other apparatus of the invention. For example, object printing apparatus 51 could be replaced by embossing apparatus for texturizing the surface of cylindrical objects such as cups to impart certain frictional or insulating characteristics.

The invention is exemplified by object feeding apparatus 50 shown in FIG. 1 includes stack advancing means 57, denesting means 58 and feeding means 60. The stack advancing means 57 receive a stack 55 of nested cups 56 arranged with their axes in a horizontal position and their open ends disposed in the direction in which they are to be fed. The stack 55 is urged forward toward turret assembly 53 by a portion of stack advancing means 57 to a point where the lips of cups 56 in the stack are frictionally engaged by another portion of stack advancing means 57 which causes the portion of the stack 55 preceding the gripped cups 56 to be advanced forward with a greater force than the remainder of the stack 55 and rotates the cups 56 in the preceding portion of the stack about their axes. Generally, the trailing portion of the stack is not rotated but is merely urged in a forward direction until gripped.

The lead cup 56 in the preceding rotating portion of the stack 55 is gripped at spaced points about its peripheral flange or lip by the denesting means 58 and separated from the next successive cup in the stack 55 by rapid advance in a forward direction at a rate substantially greater than the rate of advance of the trailing portion of the stack 55. The cup 56 thus separated from the stack 55 is gripped at spaced points about its peripheral flange by feeding means 60 and transferred in the forward direction to a point where it is received by cup support means 61 on the turret assembly 53. The placement of the cup 56 onto the cup support means 61 of the turret assembly 53 is accomplished at high speed in continuous motion and is facilitated by supporting the cup 56 to be placed upon the turret assembly 53 in a predetermined position by feeding means 60 prior to its placement and in a manner allowing movement of the cup 56 in the direction of motion of the cup support means 61 of the turret assembly 53 during the transfer.

FIGS. 1 and 2 through 4 illustrate the layout and arrangement of major components forming one embodiment of object feeding apparatus 50 of the invention. A stack 55 of nested cups 56 is disposed in a guide pan 74 with the open ends of the hollow cups 56 facing toward the turret assembly 53. Guide pan 74 has a bottom 75 and spaced upwardly diverging sidewalls 76 and 77 and forms an elongate channel having an open top. A bearing plate 78 having a centrally located longitudinal groove 80 in its upper surface is disposed upon the bottom 75 of guide pan 74.

Figure 2:
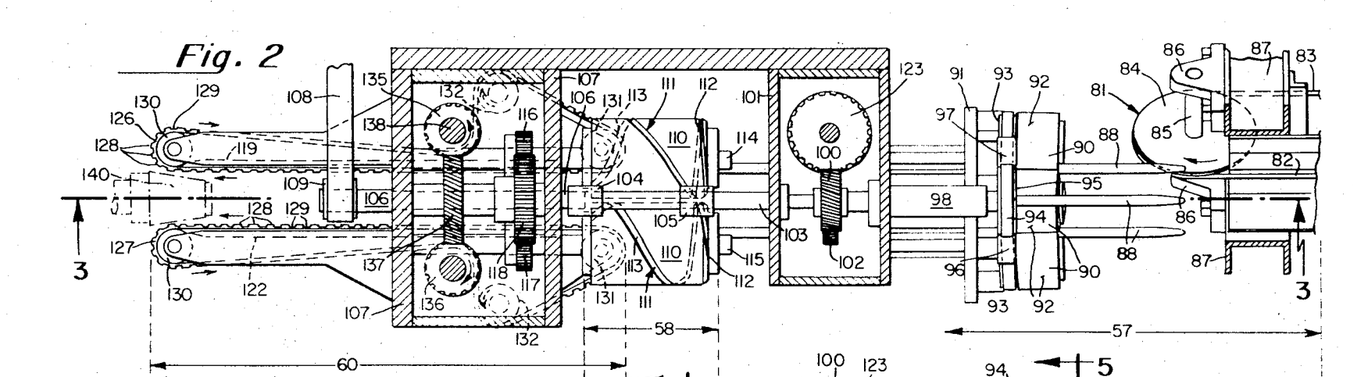
FIG. 2 is an elevation view of object feeding apparatus of the invention, employed with the apparatus shown in FIG. 1, taken at an angle of 45° to the horizontal and showing part in section.
Figure 3:
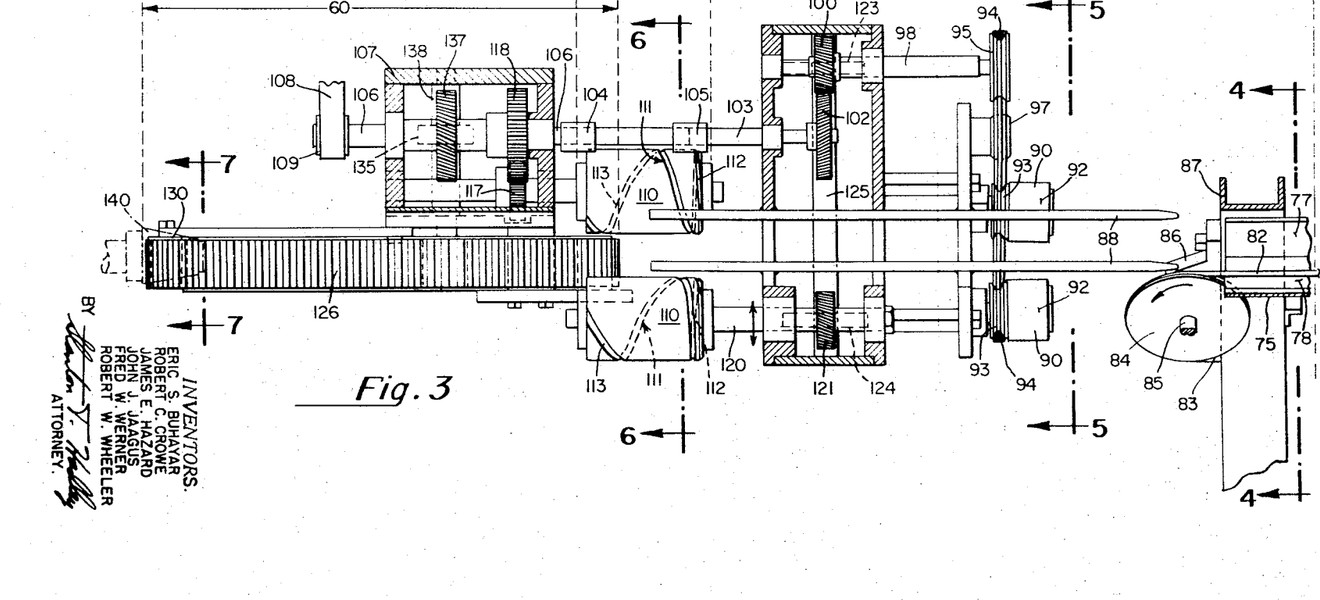
FIG. 3 is a sectional elevation view of the object feeding apparatus taken along line 3—3 of FIG. 2.
Figures 4, 5:
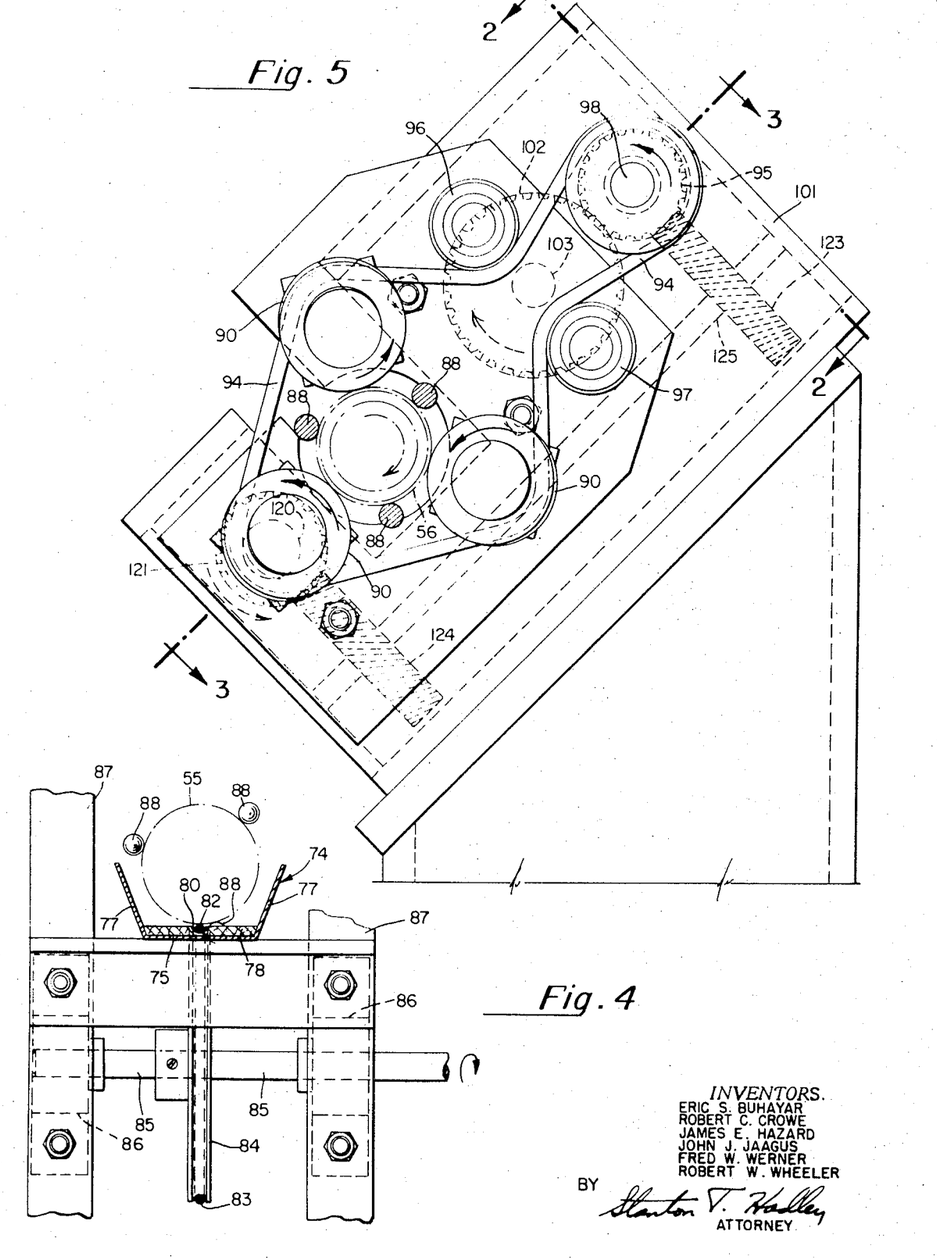
FIG. 4 is a sectional view through a portion of the stack advancing means of the object feeding apparatus taken along line 4—4 of FIG. 3.
FIG. 5 is a sectional view taken along line 5—5 of FIG. 3, illustrating another portion of the stack advancing means of the object feeding apparatus and the drive for portions of the denesting means and the stack advancing means.

One end of the first portion of stack advancing means 57 is shown in each of FIGS. 2 and 3 and in cross-section in FIG. 4. A cable conveyor 81 passes along the guide pan 74. The cable conveyor 81 has an upper flight 82 running in contact with the bearing plate 78 toward turret assembly 53 and a lower flight 83 returning in the opposite direction. The upper portion of the cable forming upper flight 82 is exposed above the surface of bearing plate 78 along the length of bearing plate 78 and the lower portion rides within the groove 80 beneath the surface of bearing plate 78. The cable conveyor 81, which passes around a grooved pulley 84 mounted upon a shaft 85 rotatably supported on spaced brackets 86 bolted to and carried by frame 87, is rotatably supported by another grooved pulley (not shown) in a similar manner at the opposite end and driven by a motor (not shown) connected to that pulley.

The upper flight 82 of cable conveyor 81 urges the stack 55 of cups 56 toward the turret assembly 53. Cups 56, which are disposed in nested relationship in a stack 55 and positioned on their sides in guide pan 74, frictionally contact the exposed portion of cable conveyor 81 with a portion of their peripheral flange or lip. In this manner, cable conveyor 81 frictionally engages the stack 55 and advances it with a relatively light force toward the denesting means 58 of the object feeding apparatus 50 and into a succeeding portion of stack advancing means 57. The pressure on the cups axially should be sufficient to close up any gaps between successive cups until limited by the configuration of the cups themselves. This insures continuity of feeding and operation of the object feeding apparatus. Guide means in the form of a plurality of rods 88 are positioned at the end of this portion of the stack advancing means 57 and generally define a passageway into and along which cups 56 are advanced. The stack 55 advanced by the cable conveyor 81 is supported by these guide rods 88 as it is fed through the remainder of the advancing means 57 and into the denesting means 58.

The succeeding portion of the stack advancing means 57 comprises a plurality of spaced-apart crowding rolls 90 arranged to contact peripheral portions of cups 56 in the stack 55 as it is carried by the guide rods 88 toward the denesting means 58. Crowding rolls 90 are disposed peripherally about the stack 55 of cups 56 between the end of guide pan 74 and the denesting means 58. The crowding rolls 90 are rotatably mounted on a frame 91 and have their axes directed at a slight angle to the path of the stack 55. The crowding rolls 90 have a cylindrical gripping portion 92 which contacts cups 56 in stack 55 and a grooved pulley portion 93 about which a drive belt 94 is arranged in partial wrapping engagement. Crowding rolls 90 are rotatably driven by belt 94 passing over a drive pulley 95, tension being supplied by guide pulleys 96 and 97. The crowding rolls 90 have their rotational axes arranged at a slight angle or skew to the path of the stack 55 of cups 56. Upon rotation of crowding rolls 90, both forward motion and rotational motion is imparted to the portion of the stack 55 preceding the cup 56 being gripped by crowding rolls 90, due to the circular array arrangement and skewed disposition of the crowding rolls 90 about stack 55.

Cups 56 in the portion of stack 55 between crowding rolls 90 and denesting means 58 are under axial pressure which insures that cups 56 in that portion of stack 55 are rotated and fed under substantial positive force into denesting means 58. Denesting means 58 determine the number of cups 56 passing through the object feeding apparatus 50 and cup feeding continuity is insured by feeding cups into denesting means 58 with substantial force. The cable conveyor 80 advances the stack 55 into the crowding rolls 90 which advance it at a slower speed toward the denesting means. Thus, cable conveyor 80 runs at a slightly higher speed than that of the stack 55, some slippage of cups 56 occurring upon upper flight 82. This insures that the cups 56 in stack 55 will be completely nested without any spaces or gaps. Any slippage which must occur in feeding the stack 55 into denesting means 58 takes place within crowding rolls 90 although resistance to slippage is greater here resulting in the greater axial pressure.

The details of the crowding roll drive are most clearly shown by FIGS. 2, 3 and 5. Drive pulley 95 is connected through a shaft 98 to a gear 100 inside a drive housing 101. Gear 100 is driven by a gear 102 connected to a shaft 103. Shaft 103 is driven through a pair of flexible couplings 104 and 105 by a main drive shaft 106 passing through a drive housing 107 and connected through pulley 109 by a belt 108 to a motor (not shown).

The denesting means 58 include a plurality of helically grooved feeder rolls 110 which are peripherally disposed about the path of the stack 55 of cups 56 between the ends of the guide rods 88 and the feeding means 60. The feeder rolls 110 are spaced relative to one another so that spaced peripheral portions of the objects being fed, such as portions of the lips of the cups 56, are simultaneously grasped by the helical groove 111 in each respective feeder roll 110 and controllably advanced along a path toward turret assembly 53 upon rotation of feeder rolls 110.

The helical groove 111 on the feeder rolls 110 is constructed in a manner whereby initial advance of the cups 56 is at a speed which closely approximates the speed of advance of the stack 55 of cups 56 while the remaining portion of the cup advance is at a progressively increased speed. Thus, helical grooves 111 are of substantially constant depth but have a pickup portion 112 of relatively low pitch or helix angle which portion first receives cups 56 from the stack 55 being advanced by the stack advancing means 57, and an accelerating portion 113 of increasing pitch or helix angle generally greater than that of the pickup portion. Feeder rolls 110 are adapted to increase the speed of cups 56 fed thereto relative to the speed of the stack 55 and to accelerate them up to the speed of the cup feeding means 60, which combine with feeder rolls 110 to effect separation of successive cups 56 from stack 55. Relative to the feeding of cups 56 to printing apparatus for decoration of their sidewalls, the separation achieved by cooperation of denesting means 58 and feeding means 60 should be at least equal to the length of a cup so that the entire sidewall is exposed and the closed end of the leading cup 56 is at least removed fron the interior of the succeeding cup 56. Preferably, the width and shape of the helical groove 111 in each roll 110 varies with the pitch of the helical groove 111 along the length of the feeder roll 110 to closely accommodate the engaged peripheral portion of the objects being grasped and advanced by the groove 111.

The feed rolls 110 are operated at constant speed and have their helical grooves 111 oriented relative to one another so that spaced peripheral portions of an object disposed between the rolls 110 and being advanced and denested from stack 55 by the rolls 110 simultaneously contact corresponding portions of each helical groove 111 in each feed roll 110. In this manner, the forwardmost object in the stack of objects being advanced is initially grasped by the feeder rolls 110 by insertion of peripherally spaced-apart portions of its outermost flange or lip into the helical groove 111 of each respective feeder roll 110. The rotation of the stack 55 by the crowding rolls 90 assists in the insertion of the periphery of the object into the grooves of the feed rolls 110. Upon rotation of the feeder rolls 110, the grasped object is propelled forward at a rapidly accelerated speed by sliding within the grooves 111 while it is rotated by the rotational movement of the feed rolls 110. The increasing pitch of helical grooves 111 causes the object to be moved much more rapidly in a forward direction than the remainder of the stack 55, resulting in some separation or denesting of the object from stack 55. This separation enables the cup 56 to be engaged separately by feeding means 60 and to be further separated from succeeding cups as desired.

The upper two feeder rolls 110 shown in FIG. 2 are rotatably mounted on shafts 114 and 115 connected to gears 116 and 117 driven by a drive gear 118 connected to the shaft 106. The lower feeder roll 110 shown in FIG. 3 is driven by a shaft 120 fixedly secured to gear 121 carried within the lower portion of drive housing 101. FIG. 5 shows in greater detail the arrangement of the drive mechanism for the lower feed roll 110. The helical gear 121 is rotatably driven by the helical gear 102 through a helical gear 95 and a pair of helical gears 123 and 124 connectd by a shaft 125. The whole drive housing 101 can be moved as indicated by the arrow in FIG. 3, thereby changing the position of the lower feed roll 110 relative to the upper two feed rolls 110 so as to allow spacing adjustment of the denesting means 58 to accommodate articles of slightly varying size. As will be apparent from the above description, the spacing of the feed rolls 110 is important in th proper adjustment of the denesting means 58. The cups 56 must be held firmly between the feeder rolls 110 to achieve positive feeding and yet not so firmly as to damage the cup or substantially inhibit its sliding movement along helical grooves 111. Preferably, a flexible cup 56 held in the denesting means 58 by feeder rolls 110 will be slightly distorted from its normal or unflexed shape when the feeder rolls are properly spaced and adjusted.

At the exit end of the denesting means 58, the separated object or cup 56 is advanced into the object feeding means 60 of the apparatus. Feeding means 60 include a pair of conveyor belts 126 and 127 having object gripping means in the form of transverse upstanding ribs 128 carried on their outer surface which are disposed opposite to one another in spaced relation with their opposing flights being arranged for movement in the same direction. Ribs 128 form spaced transverse grooves 129 in the outer surfaces of belts 126 and 127 which receive the peripheral flanges of objects, such as the lips or beads of cups 56. The conveyor belts 126 and 127 are arranged to receive cups 56 held by the exit end of the feeder rolls 110 and to grasp each cup 56 as or before it is released by the feeder rolls 110 so as to advance it to a remote position. Belts 126 and 127 are held in position between spaced sets of rotatably mounted pulleys 130 and 131, tension being applied by tension pulleys 132, and the belts 126 and 127 being driven by drive pulleys, 133 and 134, respectively. The spacing between opposed flights of belts 126 and 127 is maintained by belt guides 119 and 122 disposed behind the opposed flights of belts 126 and 127 and generally in contact with the back sides thereof.

Belts 126 and 127 are driven at an equal and constant speed which is higher than that of the stack 55. The speed of belts 126 and 127 is substantially equal to the speed of a cup 56 at the exit end of feeder rolls 110. This enables belts 126 and 127 to further separate a cup 56 from succeeding cups held within feeder rolls 110 since they move it ahead at high speed during the time the succeeding cup is being accelerated to that speed.

Figure 6:
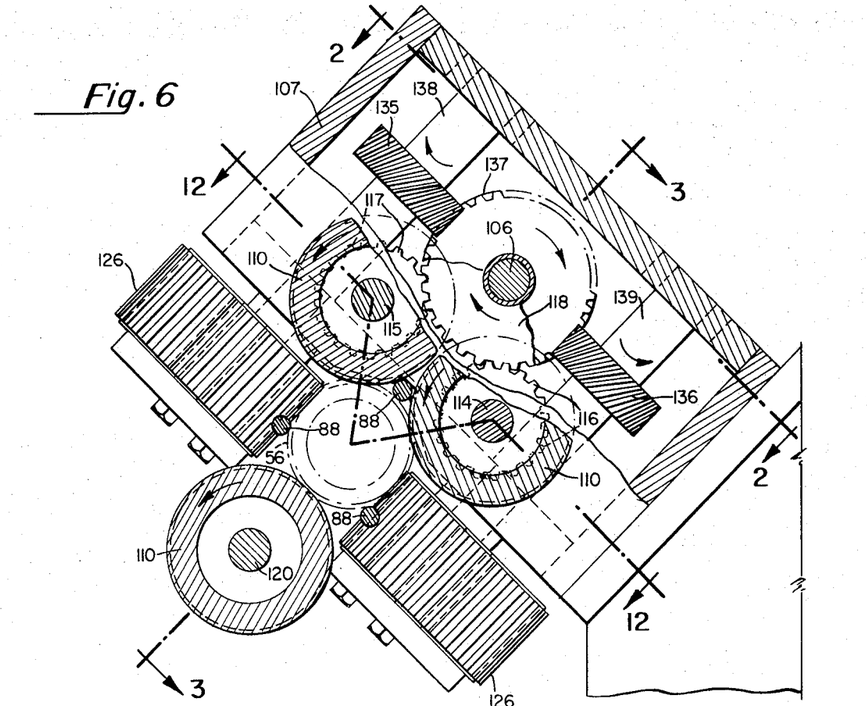
FIG. 6 is a sectional view through the denesting means of the object feeding apparatus taken along line 6—6 of FIG. 3.
Figure 12:
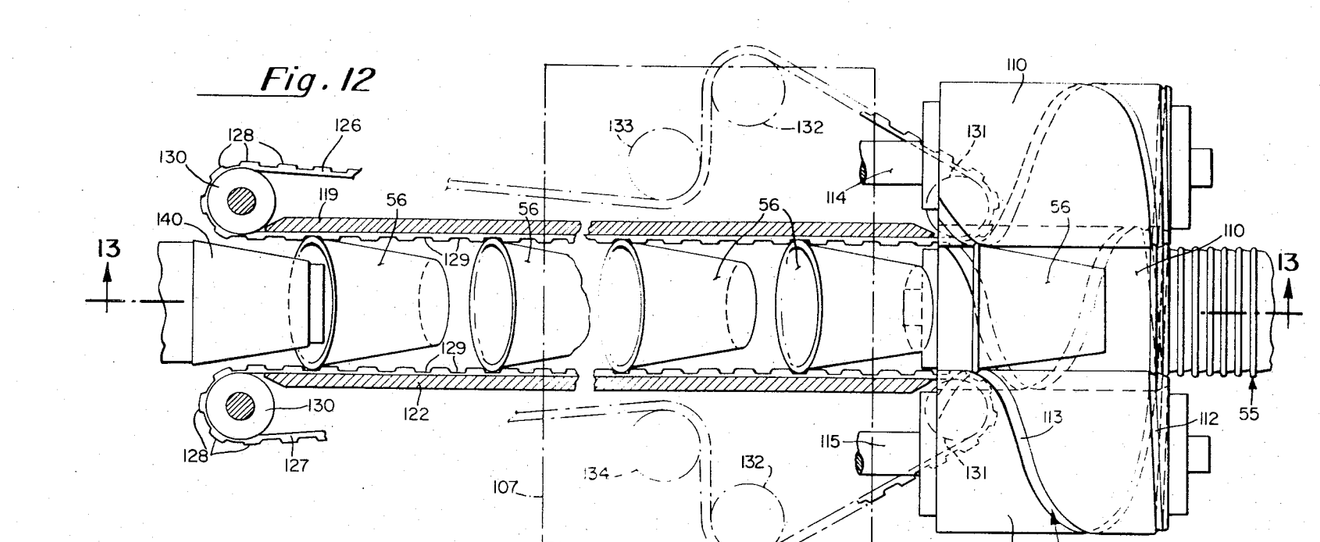
FIG. 12 is a sectional view taken along line 12—12 of FIG. 6, illustrating the cooperating arrangement of denesting means and the feeding means relative to a moving mandrel upon which an object is to be inserted.

FIGS. 2, 6 and 12 illustrate in greater detail the position of the conveyor belts 126 and 127 relative to the feed rolls 110 and also illustrates the manner in which the conveyor belts 126 and 127 are driven. A pair of helical gears 135 and 136 are driven by a helical gear 137 carried by the drive shaft 106 and drive shafts 138 and 139 connected to conveyor belt 126 and conveyor belt 127 through drive wheels 133 and 134, respectively. At this point it can be seen that a precise constantly timed relationship is maintained between crowding rolls 90 of the stack advancing means 57, the denesting means 58 and the feeding means 60 since all of these mechanisms are driven positively by one drive motor (not shown) through belt 108.

FIGS. 7 through 10 illustrate an alternative embodiment of denesting means 58 for use in object feeding apparatus 50 of the invention. The denesting means 58 illustrated include a plurality of peripherally disposed helically grooved feeder rolls 141, which are generally of shorter length than feeder rolls 110 utilized in the embodiment described with reference to FIGS. 2 and 3, in combination with a plurality of peripherally disposed conveyor belts 142, four being shown, which are cyclically operated. The helical grooves 143 in feeder rolls 141 have a relatively low constant pitch which is sufficient to slightly separate cups 56 received at the end adjacent the ends of guide rods 88 and the stack advancing means 57 from succeeding cups 56 in stack 55. Thus, cups 56 being moved by feeder rolls 141 by grasping of spaced peripheral portions within the helical grooves 143 are advanced at a slightly higher speed than succeeding cups 56 in stack 55, resulting in slight separation from the stack over the short length of travel in the feeder rolls. Feeder rolls 141 serve to positively feed cups 56 into conveyor belts 142. The slightly separated cups 56 are then gripped by upstanding ribs 144 on cyclically operated conveyor belts 142 which are adapted to match the speed of a cup 56 held in feeder rolls 141 when receiving a cup, and to match the higher speed of feeder belts 126 and 127 when transferring a cup 56 to them, thus effecting complete denesting or separation of the cups from one another.

Conveyor belts 142 are arranged in partial wrapping engagement with wheels 145 and 146 and driven by intermediate wheels 147. The arrangement of the feeder rolls 141, conveyor belts 142, and the conveyor belts 126 and 127 forming a portion of the feeding means 60 is shown more clearly in FIGS. 9 and 10.

Figure 10:
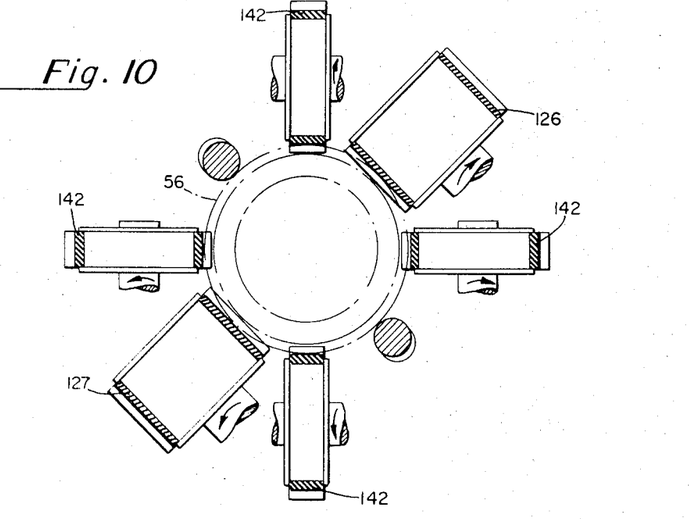
Figure 11:
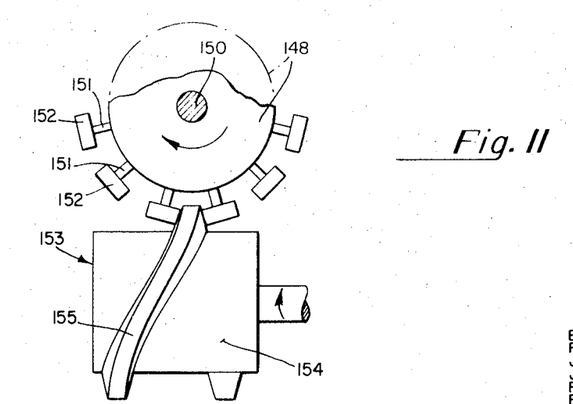
FIG. 11 is an elevation view, partly schematic, of a cyclical drive for the belts of the denesting means shown in FIG. 8.

FIG. 11 illustrates one mechanism for providing a cyclical drive to conveyor belts 142 to effect the very short cycling time which is required to obtain rapid separation or denesting of cups in a cup feeder of the type disclosed. A rotatably mounted wheel 148 connects to a shaft 150 which is operably connected to each of the drive wheels 147 which turn the conveyor belts 142. The wheel 148 has a plurality of arms 151 extending radially outward therefrom carrying a rotatable follower wheel 152 on their ends. A ridge cam 153 which comprises a cylinder 154 having an upstanding helical rib 155 extending radially outward therefrom is driven by a motor (not shown). The upstanding helical rib 155 is disposed between two adjacent arms 151 so as to contact the follower wheels 152 thereon. By varying the pitch of the helical rib 155, the spacing between the follower wheels 152, and the diameter of the cylinder 154 as well as the rate of its rotation, complete flexibility can be achieved in a cycling operation. For example, the above-described apparatus may be designed to rapidly accelerate the belts 142 to transfer a cup 56 to the conveyor belts 126 and 127, and then to quickly decelerate the belts 142 to allow their succeeding portion to pick up another cup 56 from feeder rolls 141. Thus, it can be seen that the apparatus illustrated in FIG. 10 is a suitable mechanical device for cycling the operation of belts 142 which may be operated at sufficiently high speeds to denest cups 56 at the rate of 1,000 or more per minute.

Figure 7:
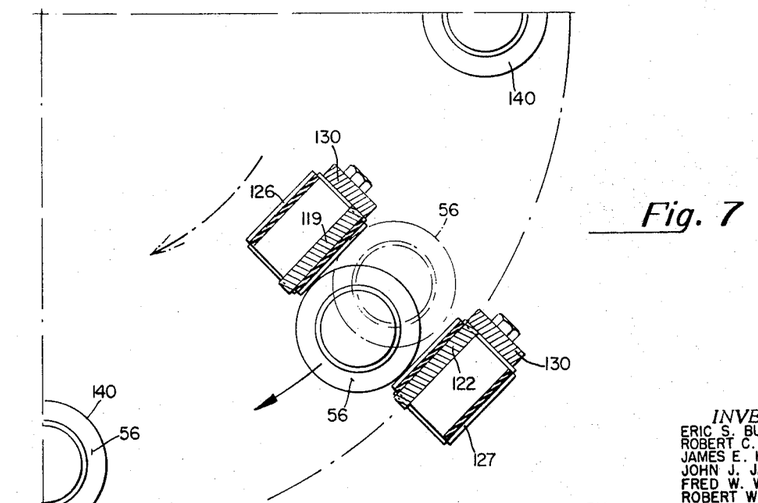
FIG. 7 is a sectional view through the object feeding means of the object feeding apparatus taken along line 7—7 of FIG. 3.
Figure 8:
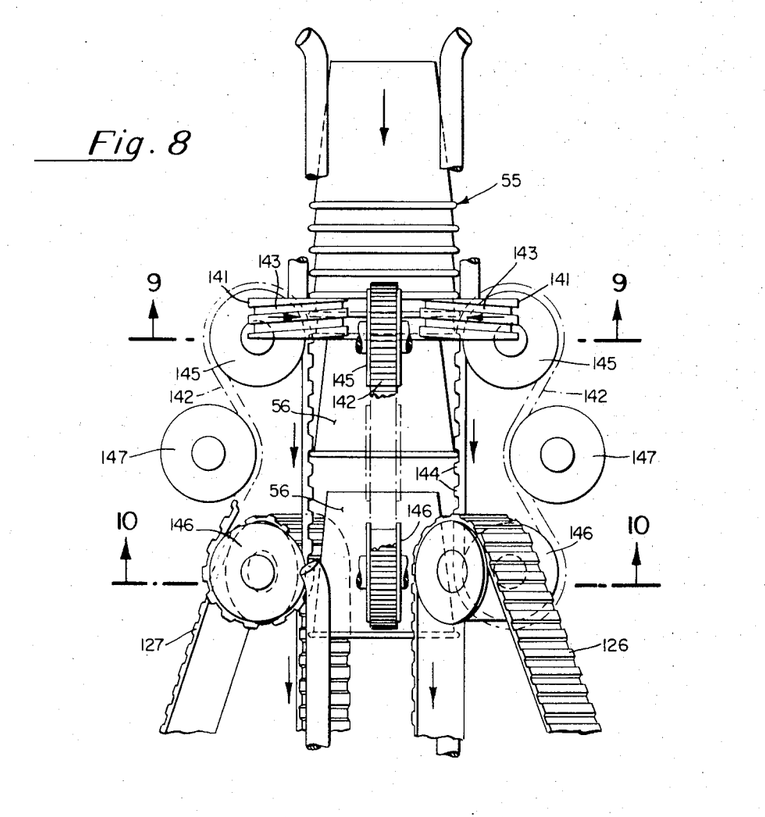
FIG. 8 is a schematic plan view of an alternative embodiment of denesting means for use in the object feeding apparatus of the invention.
Figure 9:
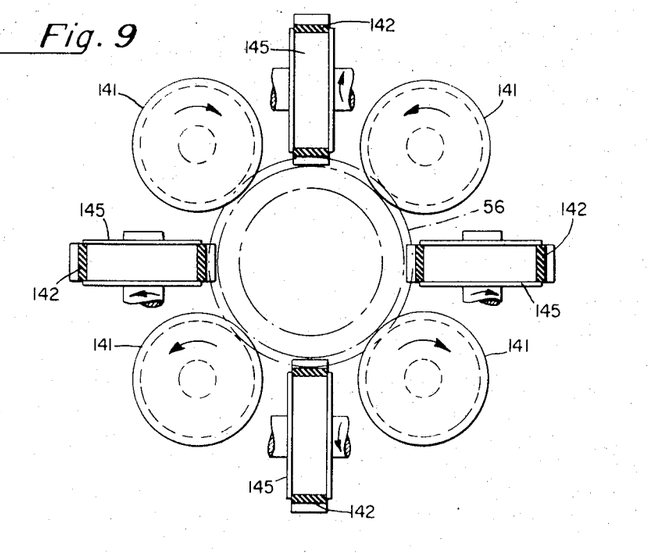
FIG. 9 is a sectional view through a portion of the denesting means taken along line 9—9 of FIG. 8, FIG. 10, is a sectional view through a portion of the denesting means taken along line 10—10 of FIG. 8.

FIGS. 12 through 16 illustrate a specific embodiment of the invention in which the apparatus is adapted to feed objects such as cups 56 to a remote point and to place them onto successive continuously moving mandrels 140 passing through the path of the cups 56 in an orbit perpendicular thereto. FIG. 7 is a sectional view illustrating the maximum lateral movement of the cups 56 which occurs during forward movement of the cups 56 onto the mandrel 140 during placement. The dotted line indicates the position of a cup 56 before contact by a mandrel 140 while the solid line indicates the position of a cup 56 after placement and at the time of release by belts 126 and 127. Thus, during the time a cup 56 moves in the direction of the orbital path of a mandrel 140 for the distance shown, it has been advanced by feeding means 60 for a distance approximating one cup length.

Figure 13:
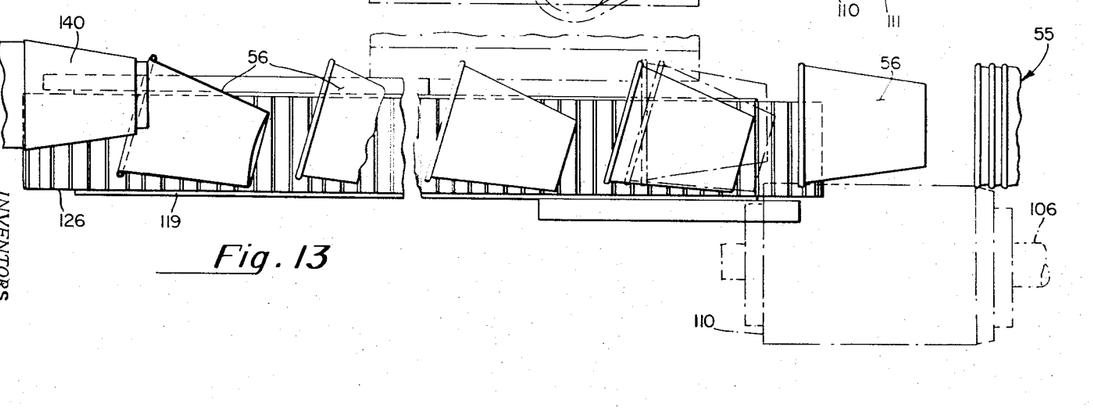
FIG. 13 is a sectional view taken along line 13—13 of FIG. 12, illustrating the attitude in which an object is held by the feeding means.

This lateral movement is permitted by providing ribs 128 extending transversely across the conveyor belts 126 and 127 which support the cups 56 so that their axis is upwardly inclined at a slight angle relative to the axis of the mandrel 140. This inclination is illustrated in FIG. 13. The degree of such inclination of a cup axis can be controlled by the spacing of ribs 128 on belts 126 and 127 and the width of the engaged portion of the cup 56. The inclination is caused by gravity but might be assisted by other means such as an air jet (not shown). The inclination also permits the entrance of the mandrel into the cup initially without catching the upper lip of the cup which is initially drawn away from the mandrel by the inclination of the cup. The transverse ribs 128 also allow the cups 56 to slide across the conveyor belts 126 and 127 in the direction of movement of the mandrel 140 during placement thereon without affecting the speed or degree of advance of the cups 56 onto the mandrel 140. FIGS. 6 and 7 show how the cups 56 are preferably placed into the grooves between ribs 128 of the conveyor belts 126 and 127 close to one side of the conveyor belts. This feature is also illustrated in FIG. 13 which shows the angle of tilt of the axis of the cups 56 and the manner in which they are gripped by the conveyor belts 126 and 127 and held within the grooves 129 between ribs 128.

Figures 14, 15, 16:
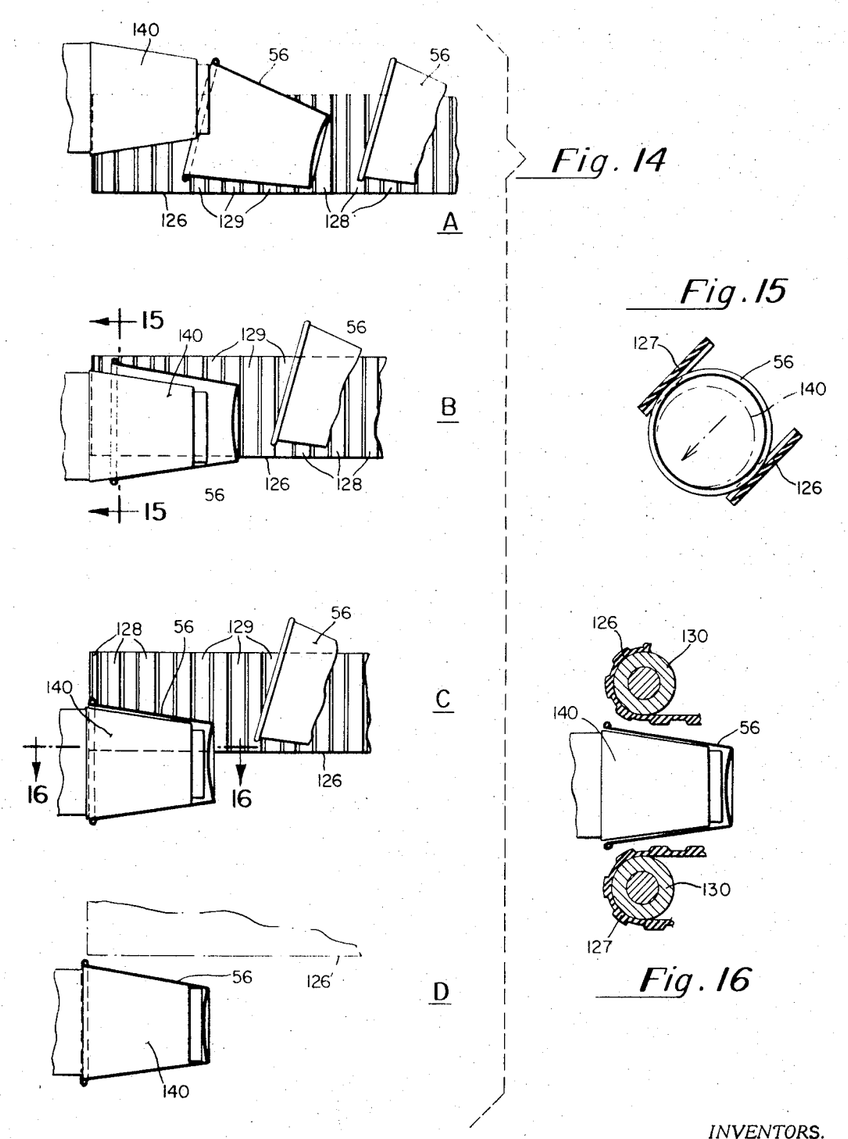
FIG. 15 is a sectional view taken along line 15—15 of FIG. 14B, illustrating one position of an object held in the object feeding means.
FIG. 16 is a sectional view taken along line 16—16 of FIG. 14C, illustrating the position of a moving mandrel relative to the object feeding means.

FIGS. 14A through 14D illustrate in greater detail the sequential steps which occur in placement of the cups 56 onto the mandrel 140. Initially, as shown in FIG. 14A, a cup 56 is moved toward an oncoming mandrel 140. The cup 56 is held between belts 126 and 127 in a manner whereby peripheral portions of the cup are gripped by the portions of the belts closely adjacent to the top edge of the belts. The movement of the belts 126 and 127 is accurately timed with the movement of mandrel 140 so that the upper edge of the open end of the cup 56 just clears the upper edge of the oncoming mandrel 140. The tilting of the cup as it is held within the grooves 129 of the belts 126 and 127 gives additional clearance between the cup and the mandrel. FIG. 14B shows a subsequent stage in the placement in which the cup 56 is partially inserted upon the mandrel 140 and has been moved laterally across belts 126 and 127 while being held within grooves 129 due to movement of mandrel 140 along its orbital path and contact with the lower side of cup 56. The cup is no longer inclined but is substantially axially aligned with the rotational axis of mandrel 140. FIG. 15 shows the position of a cup relative to belts 126 and 127 in greater detail. FIG. 14C shows a still more subsequent stage in the placement process in which a cup 56 is almost completely placed upon mandrel 140 and is about to be released by belts 126 and 127. It should be noted that the cup has been moved laterally completely across belts 126 and 127 by the action of mandrel 140 moving along its orbital path. FIG. 16 illustrates the position of cup 56 on mandrel 140 relative to grooves 129 in belts 126 and 127 at this stage of the placement. FIG. 14D illustrates the last stage of the placement process in which a cup 56 is completely placed upon a mandrel 140. In some instances, where placement of the cups 56 is not completed prior to release of the cups 56 by the conveyor belts 126 and 127, vacuum applied to the interior of the cup through a passageway in the mandrel 140 or air pressure as by a jet of compressed air applied against the closed end of the cup 56 from the exterior or both are utilized to fully seat the cup on the mandrel 140.

The above-described object feeding apparatus might be used to feed frusto-conical objects having a geometric configuration different from the cups 56 shown. In the absence of a peripheral flange or lip, the radially outermost portion of the sidewall of the object could be engaged. Similarly, the apparatus could be used to feed right cylindrical objects such as cans from a line or stack by engagement of the raised strip or bead formed by the junction of the end and the sidewall of the object.

We claim:

1. A method of individually separating and feeding hollow cylindrical objects having upstanding side walls and at least one peripheral flange extending outwardly therefrom from aligned relationship in a stack, comprising the steps of engaging at least one of a plurality of objects forming a stack and advancing the preceeding portion of the stack in a direction generally parallel with the axis of the object, positively feeding the forwardmost object in the stack into conveyor belts having flange gripping ribs, gripping said forwardmost object by engaging spaced portions of the peripheral flange with the flange gripping ribs, advancing said forwardmost object at a rate greater than the rate of advance of the remainder of the stack by increasing the speed of the conveyor belts when they grip said forwardmost object, gripping said forwardmost object by engaging spaced portions of said peripheral flange, and advancing said forwardmost object toward a remote position.

2. A method of individually separating and feeding hollow cylindrical objects having upstanding side walls and at least one peripheral flange extending outwardly therefrom from aligned relationship in a stack, comprising the steps of engaging at least one of a plurality of objects forming a stack and advancing the preceding portion of the stack in a direction generally parallel with the axis of the object, gripping the forwardmost object in the stack by engaging spaced portions of the peripheral flange with spaced feeder screws mounted for rotation about their axes and each screw having a helical groove cut into the outside surface thereof for receiving said peripheral flange, advancing said forwardmost object at a rate greater than the rate of advance of the remainder of the stack while at the same time rotating said forwardmost object by rotating all of said screws in the same direction, rotating the objects within the preceding portion of the stack about their axes prior to gripping the forwardmost object in the stack, gripping said forwardmost object by engaging spaced portions of said peripheral flange, and advancing said forwardmost object toward a remote position.

3. Apparatus for individually separating and feeding hollow cylindrical objects having an upstanding side wall and at least one peripheral flange extending outwardly therefrom from aligned relationship in a stack, comprising stack advancing means adapted to engage the flange of at least one of a plurality of aligned objects forming said stack to advance at least a portion of said stack in a direction substantially parallel with the axis of the object, denesting means adapted to engage the flange of the forwardmost object in the stack and to advance it axially at a rate greater than the rate of advance of the stack, and feeding means arranged to receive successive objects from said denesting means and to convey them toward a remote position in a predetermined orientation, said stack advancing means include conveying means for supporting and advancing at least a portion of said stack, and a plurality of rotatably driven crowding rolls peripherally disposed about said stack between said conveying means and said denesting means, said crowding rolls having their axes skewed relative to the axes of the objects in said stack, whereby a portion of the stack advanced into said crowding rolls by said conveying means is both axially rotated and axially advanced into said denesting means.

4. Apparatus according to claim 3, wherein said denesting means comprise a plurality of spaced feeder screws mounted for rotation about their axes, each of said screws having a helical groove cut into the outside surface thereof, said groove having an increasing pitch along the length of each of said screws, said screws being adapted to substantially simultaneously receive spaced portions of a peripheral flange of successive objects and to move said objects from one end of said screws to the other by forcing spaced portions of said peripheral flange received by the helical grooves to follow said helical grooves upon rotation of said screws.

5. Apparatus according to claim 4, wherein said feeder screws comprise cylinders of substantially constant cross-section along their length and mounted for constant speed rotation about their cylindrical axes, said axes being substantially parallel to and spaced from one another.

6. Apparatus according to claim 4, wherein the width of said helical grooves increases as the pitch of said helical grooves increases.

7. Apparatus according to claim 4, wherein said spaced feeder screws are adapted for rotation in the same direction whereby said objects passing through said denesting means are rotated.

8. Apparatus according to claim 7, wherein said stack advancing means include means to rotate said objects between said stack advancing means and said denesting means in the same direction as said objects are rotated by said feeder screws.

9. Apparatus for individually spearating and feeding hollow cylindrical objects having an upstanding side wall and at least one peripheral flange extending outwardly therefrom from aligned relationship in a stack, comprising stack advancing means adapted to engage the flange of at least one of a plurality of aligned objects forming said stack to advance at least a portion of said stack in a direction substantially parallel with the axis of the object, denesting means adapted to engage the flange of the forwardmost object in the stack and to advance it axially at a rate greater than the rate of advance of the stack, and feeding means arranged to receive successive objects from said denesting means and to convey them toward a remote position in a predetermined orientation, said feeding means comprise at least two conveyor belts having corresponding object carrying faces opposing each other in face-to-face relationship and adapted for movement in substantially the same direction and at substantially the same speed, the object carrying face of each conveyor belt having object engaging means, said conveyor belts being adapted to engage the radially outwardly depending flange of an object being fed by coaction of their object carrying faces and to advance it forward toward said remote point.

10. Apparatus according to claim 9, wherein said object engaging means comprise a plurality of raised ribs extending generally transversely across the exterior surface of said conveyor belts, said ribs being spaced along the length of said belts, whereby forward movement of engaged objects is maintained and lateral movement of engaged objects is permitted across at least a portion of the width of said belts.

11. Apparatus for individually separating and feeding hollow cylindrical objects having an upstanding side wall and at least one peripheral flange extending outwardly therefrom from aligned relationship in a stack, comprising stack advancing means adapted to engage the flange of at least one of a plurality of aligned objects forming said stack to advance at least a portion of said stack in a direction substantially parallel with the axis of the object, denesting means adapted to engage the flange of the forwardmost object in the stack and to advance it axially at a rate greater than the rate of advance of the stack, and feeding means arranged to receive successive objects from said denesting means and to convey them toward a remote position in a predetermined orientation, said denesting means include a plurality of feeder screws mounted for rotation about their axes, said feeder screws having a helical groove cut into the outside surface thereof, said feeder screws being adapted to substantially simultaneously receive spaced portions of the peripheral flange of successive objects and to move said objects from one end of said screws to the other by forcing spaced portions of said peripheral flange received by the helical grooves to follow said helical grooves upon rotation of said screws, and a plurality of variable speed belts arranged to receive objects from said feeder screws and adapted to grip said objects by engaging angularly offset spaced portions of said peripheral flanges, said belts being operably connected to a cyclically operating variable speed drive adapted to alternately accelerate and decelerate said belts to effect further separating of the forwardmost object in the stack from the remainder of the stack.

12. Apparatus according to claim 11, wherein said variable speed belts comprise at least two conveyor belts having corresponding object engaging faces opposing each other in face-to-face relationship and adapted for movement in substantially the same direction and at substantially the same speed, the object engaging face of each conveyor belt having a plurality of raised ribs extending generally transversely across each belt, said ribs being spaced along the length of each belt.

* * * * *